United States Patent [19]

Leo, Jr. et al.

[11] Patent Number: 4,772,507

[45] Date of Patent: Sep. 20, 1988

[54] PIPE HANGER INSULATION SUPPORT

[76] Inventors: Joseph P. Leo, Jr., 40 Periwinkle Rd., Levittown, N.Y. 11756; Sigfried W. Anderson, 733 Oliver Ave., Westbury, N.Y. 11590; James Monuszko, 15 Raspberry La., Levittown, N.Y. 11756

[21] Appl. No.: 75,845

[22] Filed: Jul. 20, 1987

[51] Int. Cl.4 .............................................. B32B 1/08
[52] U.S. Cl. ..................................... 428/218; 428/36; 428/282; 428/284; 428/285; 138/128; 138/149; 138/151
[58] Field of Search ................. 428/36, 218, 280, 282, 428/284, 285; 138/128, 149, 151

[56] References Cited

U.S. PATENT DOCUMENTS

| | | | |
|---|---|---|---|
| 2,402,781 | 6/1946 | Schreiber | 138/128 X |
| 3,245,432 | 4/1966 | Pusch | 138/151 |
| 3,563,503 | 2/1971 | Lancaster | 138/149 X |
| 3,933,182 | 1/1976 | Coites | 138/149 |
| 4,022,248 | 5/1977 | Hepner et al. | 138/149 |
| 4,307,756 | 12/1981 | Voight et al. | 138/149 |
| 4,310,585 | 1/1982 | Shannon | 428/218 |
| 4,448,219 | 5/1984 | van Hatton | 138/149 |
| 4,595,615 | 6/1986 | Cohen | 428/36 |

*Primary Examiner*—William J. Van Balen
*Attorney, Agent, or Firm*—Michael I. Kroll

[57] ABSTRACT

A pipe hanger insulation support is provided and consists of a top segment of heavy density insulation shaped to fit upon top of a pipe, a bottom segment of high compressive strength insulation shaped to fit upon bottom of the pipe and a jacket to surround both segments in which a pipe hanger can bear against.

6 Claims, 1 Drawing Sheet

PIPE HANGER INSULATION SUPPORT

BACKGROUND OF THE INVENTION

1. Field of the Invention

The instant invention relates generally to insulation material and more specifically it relates to a pipe hanger insulation support.

2. Description of the Prior Art

Numerous insulation material have been provided in prior art that are adapted to be used on hot and cold piping in concealed and exposed areas. For example, KNAUF fiberglass pipe insulation and PABCO calcium silicate block insulation are illustrative of such prior art. While these units may be suitable for the particular purpose to which they address, they would not be as suitable for the purposes of the present invention as heretofore described.

SUMMARY OF THE INVENTION

A primary object of the present invention is to provide a pipe hanger insulation support that will overcome the shortcomings of the prior art devices.

Another object is to provide a pipe hanger insulation support that combines heavy density insulation on the top and high compressive strength insulation on the bottom.

An additional object is to provide a pipe hanger insulation support that includes a jacket with a self-sealing lap which eliminates need for staples, additional material and special tools for installation.

A further object is to provide a pipe hanger insulation support that is simple and easy to use.

A still further object is to provide a pipe hanger insulation support that is economical in cost to manufacture.

Further objects of the invention will appear as the description proceeds.

To the accomplishment of the above and related objects, this invention may be embodied in the form illustrated in the accompanying drawings, attention being called to fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
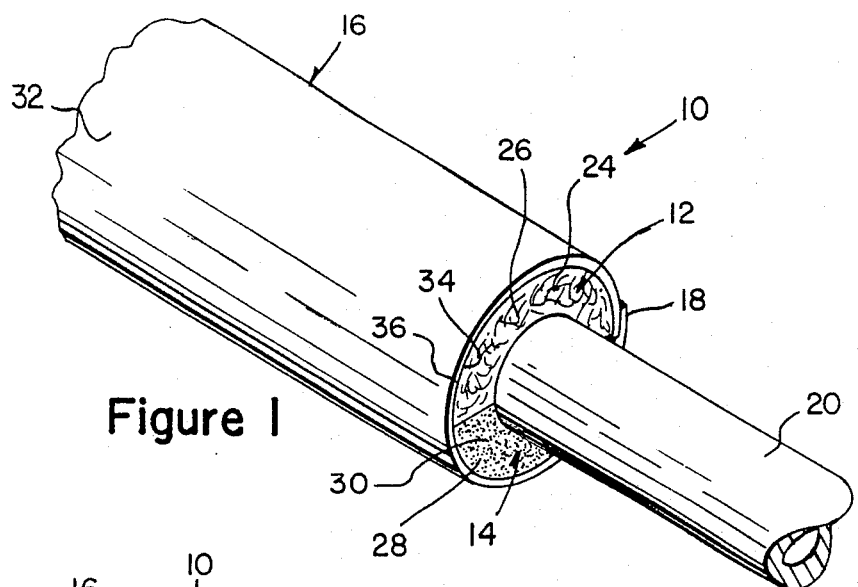
FIG. 1 is a perspective view of the invention mounted onto a pipe.
Figure 2:
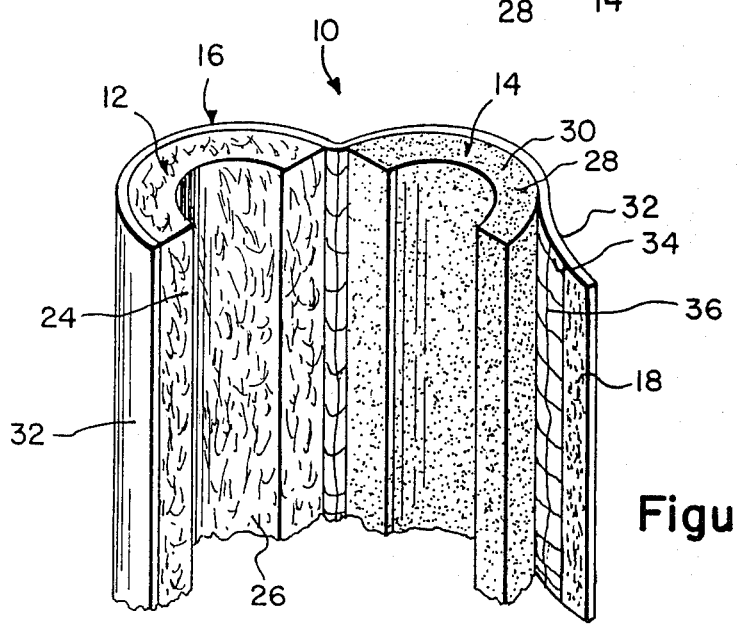
FIG. 2 is a perspective view of the invention in an open position removed from the pipe.
Figures 3, 3A, 3B:
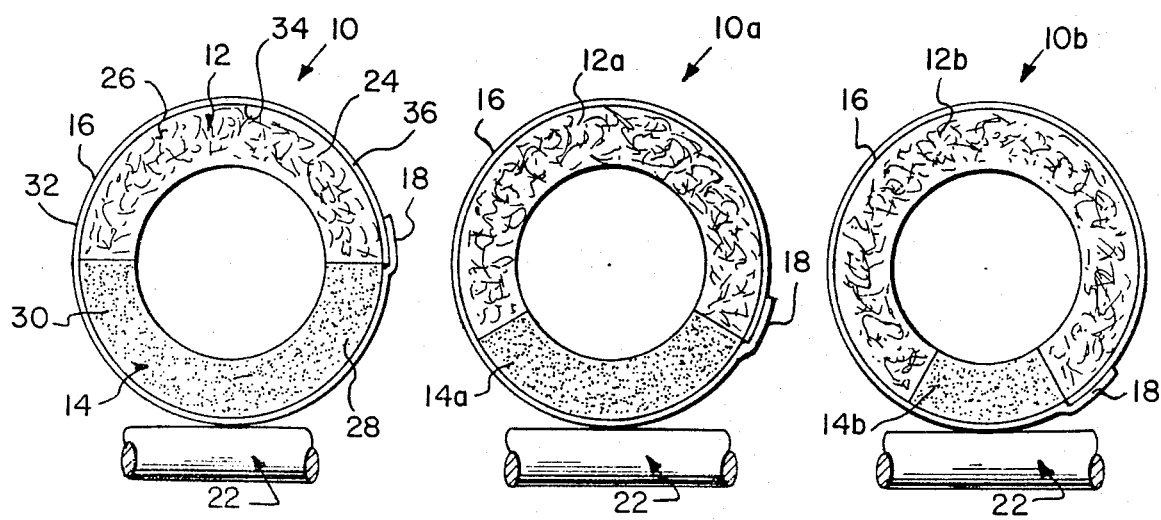
FIG. 3 is an end view showing the two equal segments thereof.
FIG. 3A is an end view similar to FIG. 3 showing a first modification in which the bottom segment is one third of the circumference.
FIG. 3B is an end view similar to FIG. 3 showing a second modification in which the bottom segment is one sixth of the circumference.

Turning now descriptively to the drawings, in which similar reference characters denote similar elements throughout the several views, FIGS. 1 through 3 illustrate a pipe hanger insulation support 10 that consists of an elongated top segment 12, an elongated bottom segment 14 and an elongated jacket 16. The top segment 12 is fabricated out of heavy density insulation material shaped to fit upon top exterior of a pipe 20. The bottom segment 14 is fabricated out of high compressive strength insulation material shaped to fit upon bottom exterior of the pipe 20. The jacket 16 surrounds both the top segment 12 and the bottom segment 14 in which a pipe hanger 22 can bear against the jacket 16 at the bottom segment 14.

The elongated top segment 12 is made from inorganic glass fibers 24 bonded with thermosetting resin 26. The elongated bottom segment 14 is made from calcium silicate 28 and reinforcing fibers 30 which possesses a needle-like xonotlite crystal structure that provides exceptional strength and extremely low water of hydration. The jacket 16 is made of white kraft paper 32 bonded to an aluminum foil 34 and reinforced with glass fibers 36. The jacket 16 further includes a self-sealing lap 18 for ease of insulation. The top segment 12 is one half of the total circumference while bottom segment 14 is one half of the total circumference.

FIG. 3A shows a first modified pipe hanger insulation support 10a in which the top segment 12a is two thirds of the total circumference while bottom segment 14a is one third of the total circumference. FIG. 3B shows a second modified pipe hanger insulation support 10b in which the top segment 12b is five sixths of the total circumference while bottom segment 14b is one sixth of the total circumference. In FIGS. 3A and 3B less of the heavy density insulation material is needed to make contact with the pipe hanger 22 but still will act as support thereof thus allowing more of the heavy density insulation material to cover the pipe 20.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

Important to the alternate methods of construction is that top segment 12 may be constructed from inorganic fiber glass or any other type of low density insulation and bottom segment 14 may be constructed from calcium silicate or any other type of high density insulation.

What is claimed is:

1. A pipe hanger insulation support which comprises:
   (a) an elongated top segment fabricated out of heavy density insulation material shaped to fit upon top exterior of a pipe;
   (b) an elongated bottom segment fabricated out of high compressive strength insulation material shaped to fit upon bottom exterior of the pipe, said elongated bottom segment being made from calcium silicate and reinforcing fibers which possesses a needle-like xonotlite crystal structure that provides exceptional strength and extremely low water of hydration; and
   (c) an elongated jacket to surround both said top segment and said bottom segment in which a pipe hanger can bear against said jacket at said bottom segment, said jacket being made of white kraft paper bonded to an aluminum foil and reinforced with glass fibers so that said glass reinforced jacket has exceptional strength and forms a double vapor barrier and together with said exceptionally strong bottom segment distributes the load of the pipe onto the hanger and eliminates the need for any metallic load bearing members.

2. A pipe hanger insulation support as recited in claim 1, wherein said elongated top segment is made from inorganic glass fibers bonded with thermosetting resin.

3. A pipe hanger insulation support as recited in claim 2, wherein said jacket further includes a self-sealing lap for ease of insulation.

4. A pipe hanger insulation support as recited in claim 3, wherein said top segment is one half of the total circumference while said bottom segment is one half of the total circumference so that a maximum load can be supported.

5. A pipe hanger insulation support as recited in claim 3, wherein said top segment is two thirds of the total circumference while said bottom segment is one third of the total circumference so that an intermediate load can be supported.

6. A pipe hanger insulation support as recited in claim 3, wherein said top segment is five sixths of the total circumference while said bottom segment is one sixth of the total circumference so that a minimum load can be supported.

* * * * *